Aug. 5, 1924.

F. G. McPHERSON 1,503,695

PROCESS OF TREATING GLASS

Filed June 28, 1923

WITNESSES

INVENTOR
Frank G. McPherson
BY
ATTORNEY

Aug. 5, 1924.  
F. G. McPHERSON  
PROCESS OF TREATING GLASS  
Filed June 28, 1923  
1,503,695  
2 Sheets-Sheet 2

WITNESSES  
Charles H. Durand  
E. N. Lovewell

INVENTOR  
Frank G. McPherson  
BY  
ATTORNEY

Patented Aug. 5, 1924.

1,503,695

UNITED STATES PATENT OFFICE.

FRANK G. McPHERSON, OF BEAVER FALLS, PENNSYLVANIA.

PROCESS OF TREATING GLASS.

Application filed June 28, 1923. Serial No. 648,323.

*To all whom it may concern:*

Be it known that I, FRANK G. McPHERSON, a citizen of the United States, residing at Beaver Falls, in the county of Beaver and State of Pennsylvania, have invented a new and useful Process of Treating Glass, of which the following is a specification.

This invention relates to a process of treating the surface of glass, and is of especial value in treating glass that is used in automobile lenses, or lighting fixtures wherein the glass is used for the transmission of light emitted from an intensified source.

The object of the invention is to provide a process for treating the surface of the glass in such a manner as to prevent the blinding effect, which is produced by the transmission of the direct rays, and yet retain a high degree of transparency, and also the diffusive qualities which are present in the best quality of frosted glass.

The best results are obtained when the process is used on glass having a roughened surface produced by physical or chemical means to give the appearance of a frosted surface. In the treatment of this kind of glass by my improved process, the transparency of the same is greatly improved without in any way diminishing the diffusive qualities of the glass.

In order that the process may be clearly understood the same will be described in connection with the accompanying drawings, in which Figure 1 is a plan view of a lens of frosted glass before treatment.

Figure 1:
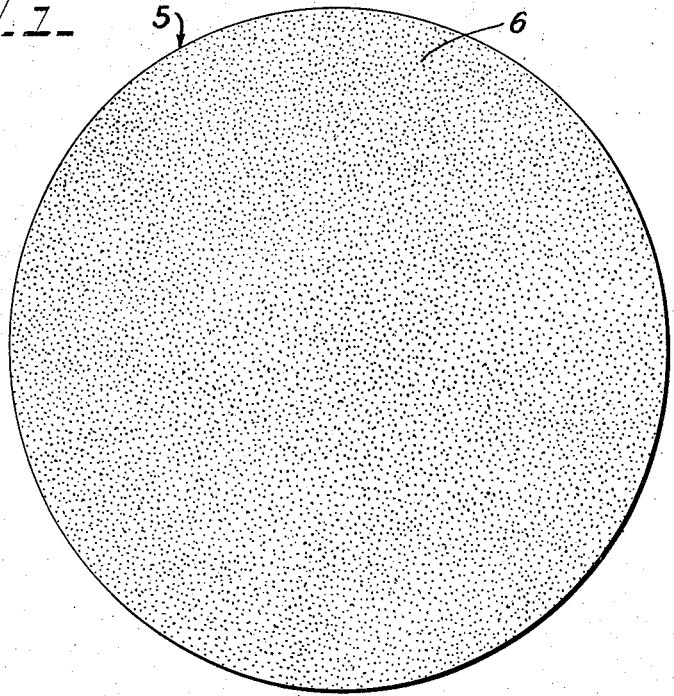
Figure 2:
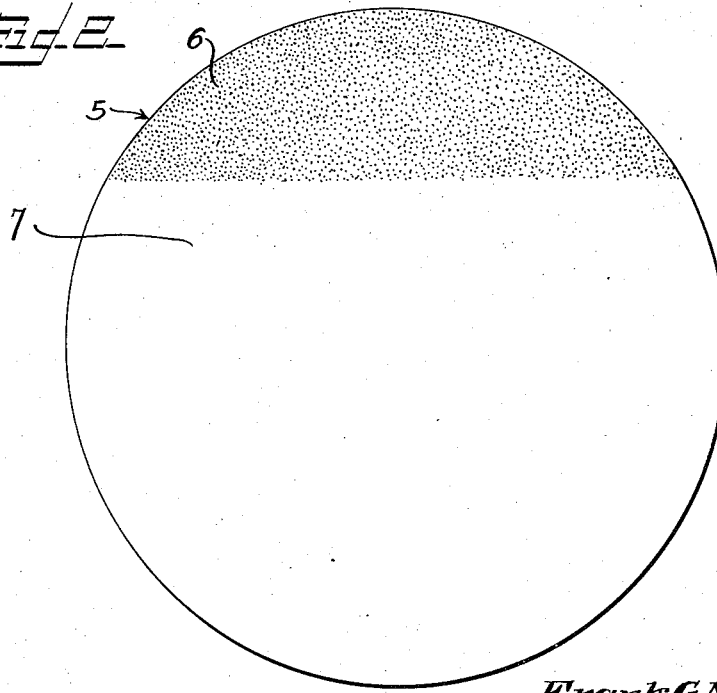
Figure 2 is a plan view of the same after the lower portion thereof has been through the first step of the process.
Figure 3:
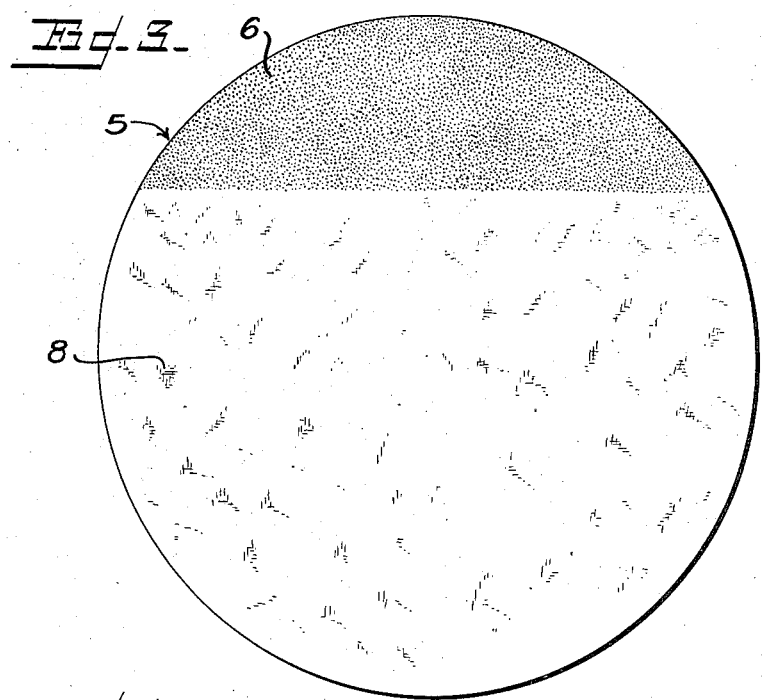
Figure 3 is a plan view of the same after the process has been completed.

The lens 5, in which the surface 6 has been previously roughened by any suitable process, is first treated over all or a part of its roughened surface with a liquid coating of varnish, lacquer or the like, which is preferably free from pigment. This coating shown at 7, in Figure 2, smooths over the roughened surface, and makes the same nearly as transparent as clear glass. Owing to the difference in the refractive indices of the glass and the coating, however, the diffusive qualities of the roughened or frosted glass are retained. The effect is improved however, by the second step of the process. which includes the treatment of the surface by impression or contact before the coating is dry. This impression may be made by laying on or impressing a sheet of finely woven linen, which transmits to the surface a linen-like mesh pattern, as indicated at 8. The differences in thickness thereby produced in the coating causes a further variation in the refractive effect thereof, and increases the diffusion.

Figure 4:
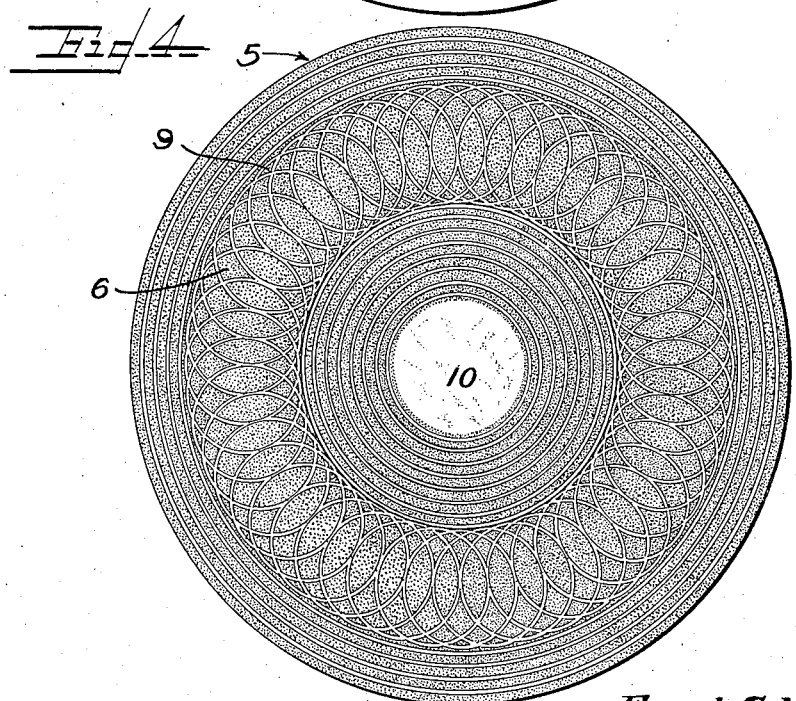
Figure 4 is a plan view of a completed lens, in which the first step of the process has been modified.

In the first step of the process, the liquid may be applied by rubbing, brushing, flowing, with a sponge, or by printing with a die of distinctive pattern, as shown at 9 in Figure 4. In this form the central portion 10 is preferably covered completely with the varnish, in order that a higher degree of transparency may be obtained for the central part of the lens.

The second step may be effected by a single impression of a finely woven cloth as mentioned above, or a number of light impressions may be made with the cloth in various positions, so that a somewhat mottled or irregular surface is imparted to the varnish, or the same step may be effected by stippling lightly with a brush or sponge. The design shown in Figure 4 is produced by a rubber pad or mat placed in contact with the glass, after it has been treated by a coat of varnish.

By means of this process, the glass is given an appearance which is ornamental as well as useful. Different degrees of density are also possible by variations in the nature of the coating, and the manner in which the same is applied.

With glass treated according to the process herein described, the freedom of passage and projection of light rays is almost the same as with clear glass, while the rays are completely diffused so that the light emitted therethrough has no dazzling effect on the eyes. The uniform diffusion of the light also avoids the shadows or zones of partial darkness, which are in evidence when light passes through a lens having irregular diffracting surfaces.

While the process is used with the best results on a frosted or roughened surface, a fairly good result may be obtained by using the same process on clear glass.

As will be understood from the foregoing description the process is capable of various modifications, and it is my intention to include such modifications as embody the essential principles of the invention within the scope of the appended claims.

What is claimed is:

1. The process of treating glass, which consists in coating portions of its surface with a liquid having a high degree of transparency, then treating it by impression or contact before it is dry to remove the gloss, and then allowing the same to dry.

2. The process of treating glass, which consists in coating portions of its surface with varnish or the like, treating it by impression or contact before the varnish is dry, and then allowing the same to dry.

3. The process of treating glass, which consists in coating portions of its surface with a liquid having a high degree of transparency, impressing the same with a fibrous design before the coating is dry, then allowing the same to become perfectly dry.

4. The process of treating glass, which consists in applying varnish or the like to portions of its surface, impressing the same before it is dry with a fibrous design, then allowing the same to dry.

5. The process of treating glass having a frosted surface which consists in applying a coating to its surface, then impressing the same before it is dry with a textile fabric, and then allowing it to dry.

In testimony, that I claim the foregoing as my own, I have hereto affixed my signature.

FRANK G. McPHERSON.